United States Patent Office 3,217,552
Patented Nov. 16, 1965

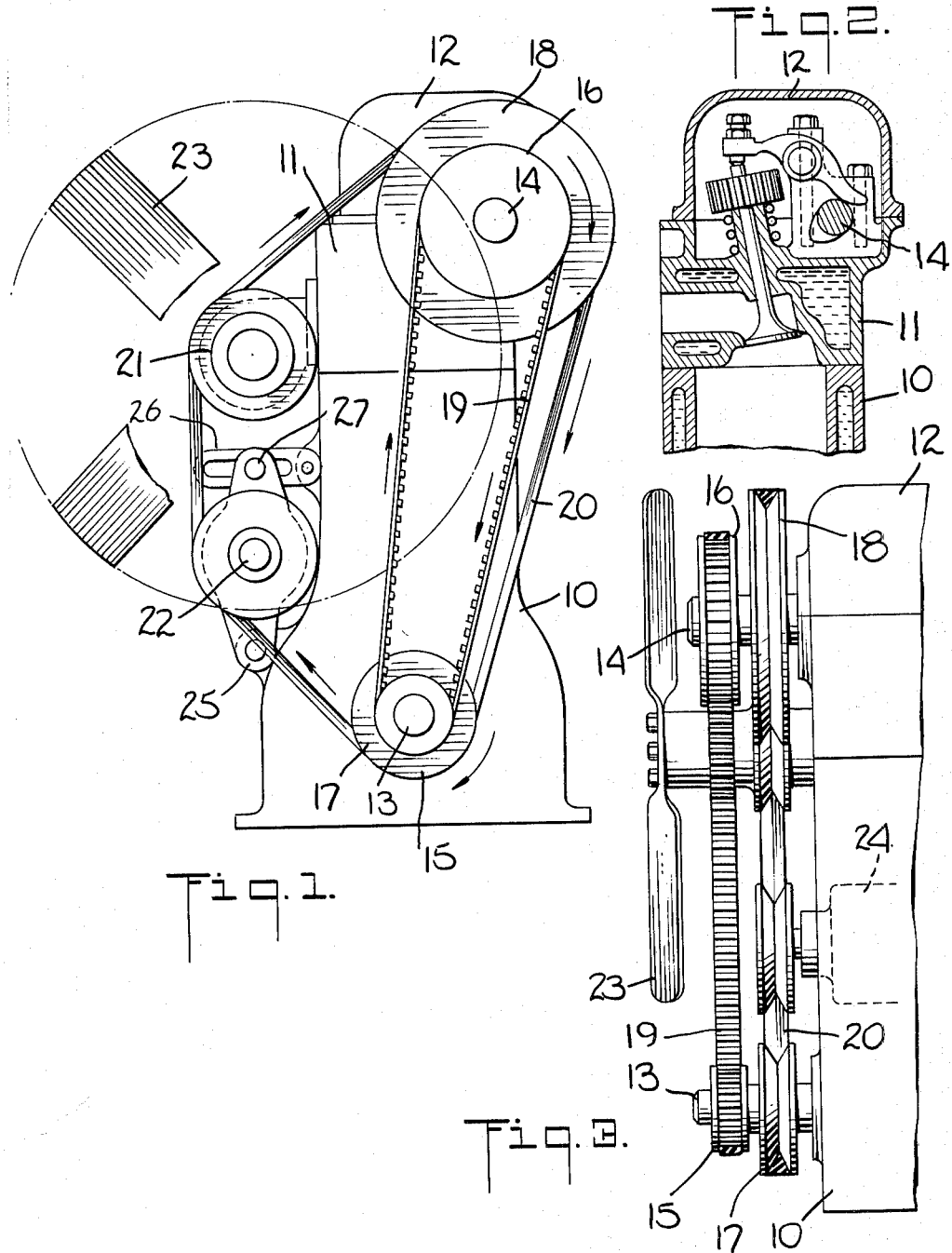

3,217,552
TIMING DRIVE
Rudolph Daub, 9 Hickory Drive, Box 106,
North Caldwell, N.J.
Filed July 29, 1963, Ser. No. 298,384
6 Claims. (Cl. 74—219)

This invention relates to means for driving one shaft by another and, more particularly, to drives maintaining an exact timed relation between the shafts.

Drives of this type may be intermeshing gears or gears on a respective shaft coupled by chains or toothed belts. The toothed belt drive is used for light duty and the chain and gear drives for medium and heavy duty, respectively. It is desirable to use toothed belt drives for medium and heavy duty, such as camshaft drives of internal combustion engines.

In piston engines of high specific output, it is desirable to locate the camshaft in the cylinder head close to the valves to be actuated. This eliminates tappets and push rods as required in engines having the camshaft located in the crank case and in close proximity to the crankshaft from which it can be driven by either only two gears or a short chain.

Placing the camshaft in the head requires either a string of gears or a long chain equipped with tensioning devices and dampening devices. Both driving elements must be encased in oiltight housings, which adds to the cost. For this reason most engines have a close coupled and less bulky cam drive and use push rods to reach the valves, thereby keeping the camshaft close to the crankshaft.

A toothed belt for overhead camshafts has been used in some engines, thereby avoiding the cost of gear or chain drives of an overhead camshaft and avoiding two tappets and two push rods per cylinder in the lower camshaft drive.

The main object of the invention is to improve toothed belt drives for medium and heavy duty use, such as camshaft drives of internal combustion engines, and to improve the reliability and durability of toothed belt drives.

The invention will be explained as applied to a four-cycle internal combustion engine in connection with the drawings in which:

FIG. 1 is the front view of an in-line engine;

FIG. 2 is a fragmentary section of a cylinder head showing the location of the camshaft in the cylinder head; and FIG. 3 is a side view of the engine showing its front end with the driving pulleys.

Referring to FIGS. 1, 2 and 3, the reference numeral 10 designates the cylinder block 11 the cylinder head and 12 the cylinder head cover. These elements form a main supporting structure. The crankshaft 13 is located at the lower end of cylinder block 10. The camshaft 14 is located at the parting line of cylinder head 11 and cover 12. Keyed to crankshaft 13 and camshaft 14 are the toothed wheels 15 and 16, respectively, as well as the V-type pulleys 17 and 18, respectively.

A toothed belt 19 is strapped over wheels 15 and 16 and a V-belt 20 over pulleys 17 and 18. V-belt 20 is also employed to drive fan pulley 21 and generator pulley 22 which in turn drive the fan 23 and the generator 24, respectively. The tension of the V-belt 20 can be adjusted by swinging the generator 24 around fulcrum 25 which is fastened to cylinder block 10. The generator is secured in its desired position by linkage 26 and bolt 27.

The ratio between the crankshaft and the camshaft must be exactly 1:2, achieved by the appropriate number of teeth on the crankshaft wheel 15 and camshaft wheel 16. By making the ratio between the crankshaft pulley 17 and the camshaft pulley 18 slightly less than 1:2, i.e., about 1:1.98, it is assured that the V-belt will always drive the camshaft. Since the pulleys 17, 18, 20 and 21 are smooth, slippage may occur between the belt and pulleys. In doing so it is subject to a theoretical creep of 1% on its pulleys, thereby relieving the toothed belt of driving tension. The toothed belt functions to hold the drive and camshafts in timed relation against the drive of the smooth belt. This permits the relatively expensive toothed belt and toothed wheels to be made with the smallest possible dimensions, thereby reducing cost while maintaining durability.

The V-belt used to drive the camshaft also drives the fan and the generator, fulfilling the function of the V-belt as presently used in a conventional manner.

Driving the camshaft, fan and generator by the same belt has the advantage of adding considerable flywheel effect and inertia of both fan and generator to the camshaft, thereby "steadying" and dampening the fluctuations of this drive, thus making it uniform and without backlash on the toothed wheel. This is of utmost importance especially for low cost engines having four cylinders or less in which engines the camshaft due to the low number of lobes has a tendency to "kick" backwards while rotating. This subjects the driving elements to torsional vibrations with all the consequent disadvantages, such as high wear, excessive noise plus lobe wear and valve clatter. This "kick-back" would be particularly disadvantageous to a toothed belt, particularly to one of such length as needed to reach a camshaft located high up in the head away from the crankshaft. This is evidenced by current chain drives which need elaborate damping and tensioning devices. Even on 6-cylinder, in-line engines with a comparatively smooth camshaft torque due to the presence of 12 lobes such devices are required.

Although the foregoing embodiment is described in connection with an internal combustion engine, it is adaptable to other timed shaft drives where timing accuracy, low cost, low noise, suppression of torsional vibrations, uniform turning motion, and utmost reliability are paramount requirements.

The invention is set forth in the appended claims.

I claim:

1. A timing drive mechanism coupling a power delivering shaft and a power receiving shaft rotatably mounted in a main supporting structure comprising toothed gears on said shafts, a toothed belt intermeshing with said toothed gears to maintain precise rotative relation of said shafts, rotatable inertia means mounted on a main supporting structure and having a first smooth pulley in torque transmitting relation with said rotatable inertia means, second and third smooth pulleys on said power delivering and power receiving shafts respectively, said first, second, and third smooth pulleys being positioned in relation to one another for engagement by a smooth belt in a force transmitting relation and a smooth belt engaging said first, second and third smooth pulleys in slippable relation to transmit from said power delivering shaft to said power receiving shaft power steadied by said rotatable inertia means through said first smooth pulley while said shafts are maintained in precise rotative relation by said toothed belt.

2. A timed drive for an internal combustion engine having a power delivering crankshaft and a power receiving camshaft subject to torsional vibration comprising toothed gears on said shafts, a toothed belt intermeshing with said toothed gears to maintain precise rotative relation of said shafts, auxiliary rotary power receiving means mounted on said engine with a first smooth pulley for driving said power receiving means, second and third smooth pulleys on said respective power delivering and power receiving shafts and a smooth belt engaging said first, second and third smooth pulleys in slippable relation to transmit power from said crankshaft to said auxiliary power receiving means and said camshaft with said auxiliary power means through said first smooth pulley steadying the transmission of power to said camshaft for dampening torsional vibrations therein while said shafts are maintained in precise rotative relation by said toothed belt.

3. A timed drive as set forth in claim 2 wherein said auxiliary power receiving means is a cooling fan.

4. A timed drive as set forth in claim 2 wherein said auxiliary power receiving means is an electric generator.

5. A timed drive mechanism coupling a power delivering shaft and a power receiving shaft comprising toothed gears on said shafts, a toothed belt intermeshing with said toothed gears to maintain precise rotative relation of said shafts, first and second smooth pulleys on said respective shafts and a smooth belt engaging said smooth pulleys in slippable relation to transmit power from said power delivering shaft to said power receiving shaft through said first and second smooth pulleys while said toothed gears and belt maintain said shaft in precise rotative relation.

6. A timed drive mechanism as set forth in claim 5 wherein the ratio of said toothed gears is slightly greater than the ratio of said first and second smooth pulleys to allow for slippage of said smooth belt.

References Cited by the Examiner
UNITED STATES PATENTS

| | | | |
|---|---|---|---|
| 146,685 | 1/1874 | Jones et al. | 74—722 X |
| 2,037,436 | 4/1936 | Roddewig et al. | |
| 2,674,896 | 4/1954 | Arones | 74—217 |

DON A. WAITE, *Primary Examiner.*